United States Patent
Wörner et al.

[19]

[11] Patent Number: 6,161,447

[45] Date of Patent: Dec. 19, 2000

[54] SELECTION SYSTEM FOR AN AUTOMATIC MOTOR VEHICLE TRANSMISSION

[75] Inventors: Günter Wörner, Kernen; Hartmut Gösele, Neubulach, both of Germany

[73] Assignee: DaimlerChrysler AG, Stuttgart, Germany

[21] Appl. No.: 09/300,524

[22] Filed: Apr. 28, 1999

[30] Foreign Application Priority Data

Apr. 28, 1998 [DE] Germany ............... 198 18 863

[51] Int. Cl.[7] ............... F16H 59/10; F16H 61/22; B60K 20/02

[52] U.S. Cl. .................. 74/473.21; 74/473.23; 74/483 K; 74/520; 192/220.2; 192/220.4; 477/96

[58] Field of Search ............ 74/473.21, 473.22, 74/473.23, 483 R, 483 K, 520, 473.24, 473.26, 473.28; 192/220.2, 220.3, 220.4, 220.7; 477/96

[56] References Cited

FOREIGN PATENT DOCUMENTS

| | | |
|---|---|---|
| 0 709 597 | 5/1996 | European Pat. Off. . |
| 41 18 519 | 2/1993 | Germany . |
| 196 01 442 | 7/1997 | Germany . |
| 196 41 706 | 3/1998 | Germany . |
| 0625656 A1 | 5/1994 | United Kingdom . |

*Primary Examiner*—David A. Buce
*Assistant Examiner*—William C. Joyce
*Attorney, Agent, or Firm*—Evenson, McKeown, Edwards & Lenahan, P.L.L.C.

[57] ABSTRACT

A selection system for an automatic motor vehicle transmission has a selector element for selecting transmission adjustments (P, R, N, D) which can be manually adjusted. A toggle lever arrangement connected with the selector element acts transversely to the moving direction of a locking element. As a result, a manual force on the selector element cannot be transmitted or can only be transmitted in a highly reduced manner to the locking element. To reduce the overall size of the systems, the locking element is preferably an armature of a solenoid arranged parallel to the axes of rotation of the toggle lever arrangement.

16 Claims, 3 Drawing Sheets

SELECTION SYSTEM FOR AN AUTOMATIC MOTOR VEHICLE TRANSMISSION

CROSS REFERENCE TO RELATED APPLICATIONS

This application is related to two concurrently filed applications, Ser. No. 09/300,518 and 09/300,525, filed Apr. 28, 1999, respectively, in the name of Günter Wörner et al. for Selection System For An Automatic Motor Vehicle Transmission; based upon German applications 198 18 866.8-14 and 198 18 864.1-14, filed in Germany on Apr. 28, 1998, the subject matter of which is incorporated herein by reference.

BACKGROUND OF THE INVENTION

This application claims the priority of 198 18 863.3, filed Apr. 28, 1998, the disclosure of which is expressly incorporated by reference herein.

The present invention relates to a selection system for an automatic motor vehicle transmission, and more particularly, to a selection system comprising selector element configured to be manually adjustable to different positions for selecting transmission adjustments, a locking system having a controlled actuator arrangement for automatic locking and unlocking of the selector element in at least one defined position (P, N) as a function of defined operating conditions.

The invention further relates to all types of automatic transmissions, for example, fully automatic and partially automatic gear boxes. In addition, so-called automatic converter step mechanisms and variable transmissions with infinitely variable transmission ratios with or without gears are also contemplated.

One such known selection system is described in DE-196 41 706 C1. The selector element is a swivellably disposed selector lever which can be swivelled from a parking position P by way of a reversing position R into a neutral position or idling position N, in which the torque transmitting of the vehicle transmission is interrupted, and into at least one forward driving position D.

For positions P and N, locks are provided which act as a function of certain operating conditions. In the parking position P, a locking of the selector lever is required as long as the vehicle brake is not operated and the ignition key is not situated in the ignition lock (or the ignition is not switched on). As soon as the ignition key is situated in the ignition lock (or the ignition is switched on) and the brake is operated, the selector lever is to be released. In the following description, this function will be called a P-lock. For operation of the selector lever from the neutral position N into the reversing position R, a lock is also provided which is to be active as long as the vehicle has not yet fallen below a defined limit speed. In the following description, this function will be called an R-lock. However, an operation of the selector lever from D to N, however, must not be hindered by these locks. These functions are carried out as described in DE-196 41 706 C1.

DE 196 01 442 C2 discloses an arrangement in which locking systems of the selector lever, which are assigned to the parking position P and the reversing position R, can be unlocked by exciting a solenoid. The locking function is generated by spring force. In this known selector lever lock, the armature has pin-type locking members on its axial ends. These locking members engage in bores on web flanges of the selector lever for the purpose of locking.

The actuators or control elements, which bring the above-mentioned locking devices into the locking and the unlocking position, are preferably electromagnetic control elements and springs but may also be other elements, such as hydraulically or pneumatically operated elements. It should not be possible to unlock the locks at the selector element by a driver's manual operating force, if the operating conditions which are required for an unlocking do not exist; for example, without a driving authorization of the driver; unless the ignition key is in the ignition lock; the vehicle brake is activated; when a vehicle break lock is not unlocked; and/or if the vehicle speed is below or above a defined limit value.

A control element must, however, also be able to unlock the lock if the corresponding operating conditions have been met but the driver has exercised a manual operating force on the selector element before these operating conditions have been met. In this situation, there is the risk that the mechanical locking elements are compressed so much by the manual operating force on the selector lever that they can no longer be separated by a control element or that the control element would have to be unacceptably large with respect to the required space and weight or because of the resultant higher operating heat by a larger electromagnetic control element.

SUMMARY OF THE INVENTION

An object of the present invention to construct the selection system such that a locking system of the selector element can be automatically and securely unlocked without the requirement of larger or higher-powered control elements if a manual operating force is exercised on the selector element before the operating conditions exist which are required for an unlocking of the locking system.

According to the present invention, this object has achieved by providing that the locking system has a toggle lever arrangement having a toggle assembly which is formed between two legs, the end of the leg away from the toggle assembly being rotatably about an axis of rotation connected with the selector element, and the end of the other leg away from the toggle assembly being swivellably about another axis of rotation disposed in a stationary bearing. The two axes of rotation and the toggle assembly axis of rotation are arranged parallel to one another and at a right angle with respect to a moving direction of the selector element such that the toggle assembly moved by the selector element together with its two legs swivels about the axis of rotation of the stationary bearing. The actuator arrangement has a locking element which blocks or releases the toggle assembly from movement along a predetermined path as a function of the operating conditions.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 4:
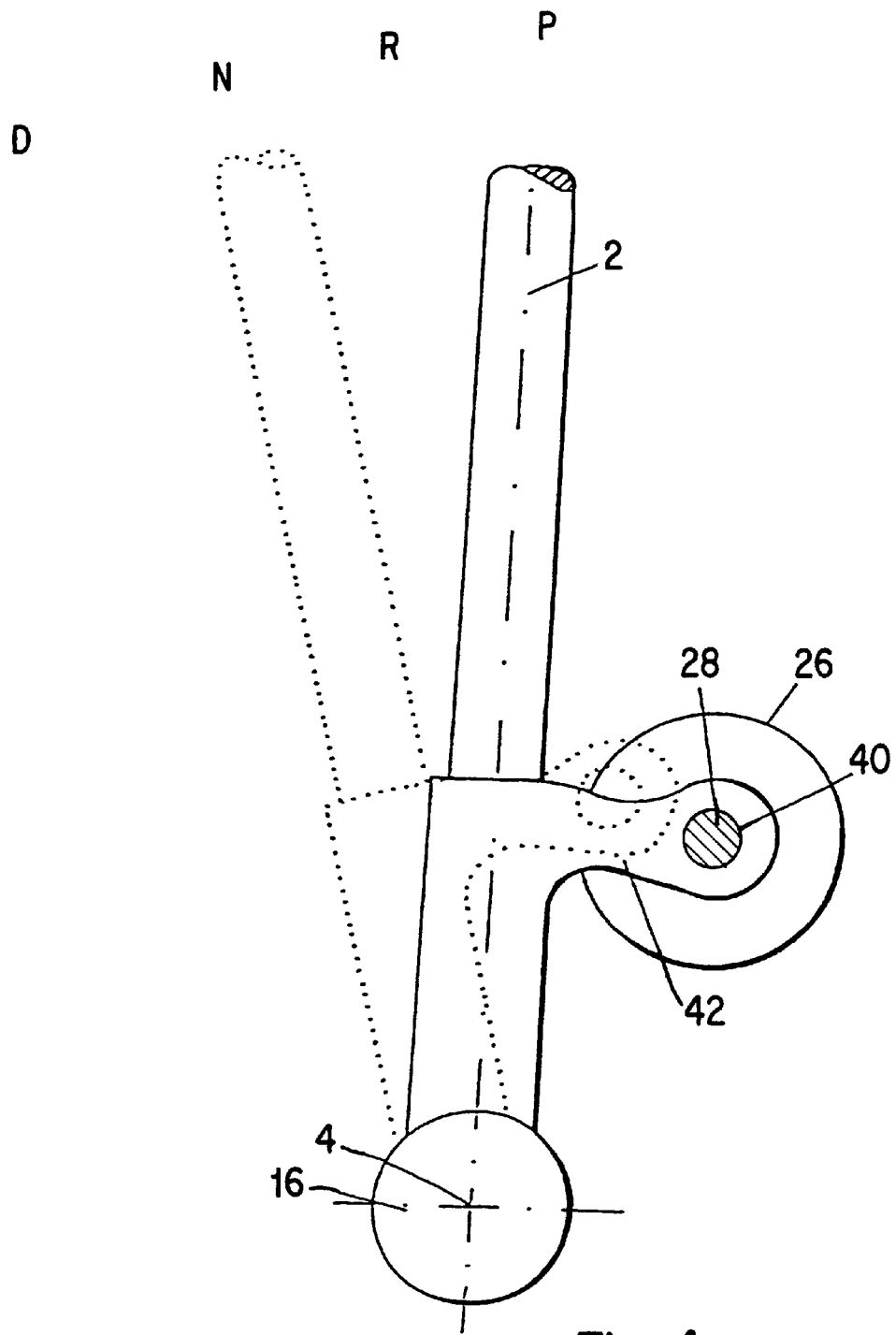
FIG. 4 is a schematic front view of a known selection system.

In the known selection system illustrated in FIG. 4, the armature 28 of a solenoid 26 reaches into a bore 40 which is formed in a lug 42 which is rigidly connected with the selector lever 2. A manual force on the selector lever 2 generates a corresponding, relatively strong transverse force from the lug 42 to the armature 28 if a manual force is exercised by the driver on the selector lever 2 before the armature 28 was moved out and was thus moved from the locking position into the unlocking position.

Figure 1:
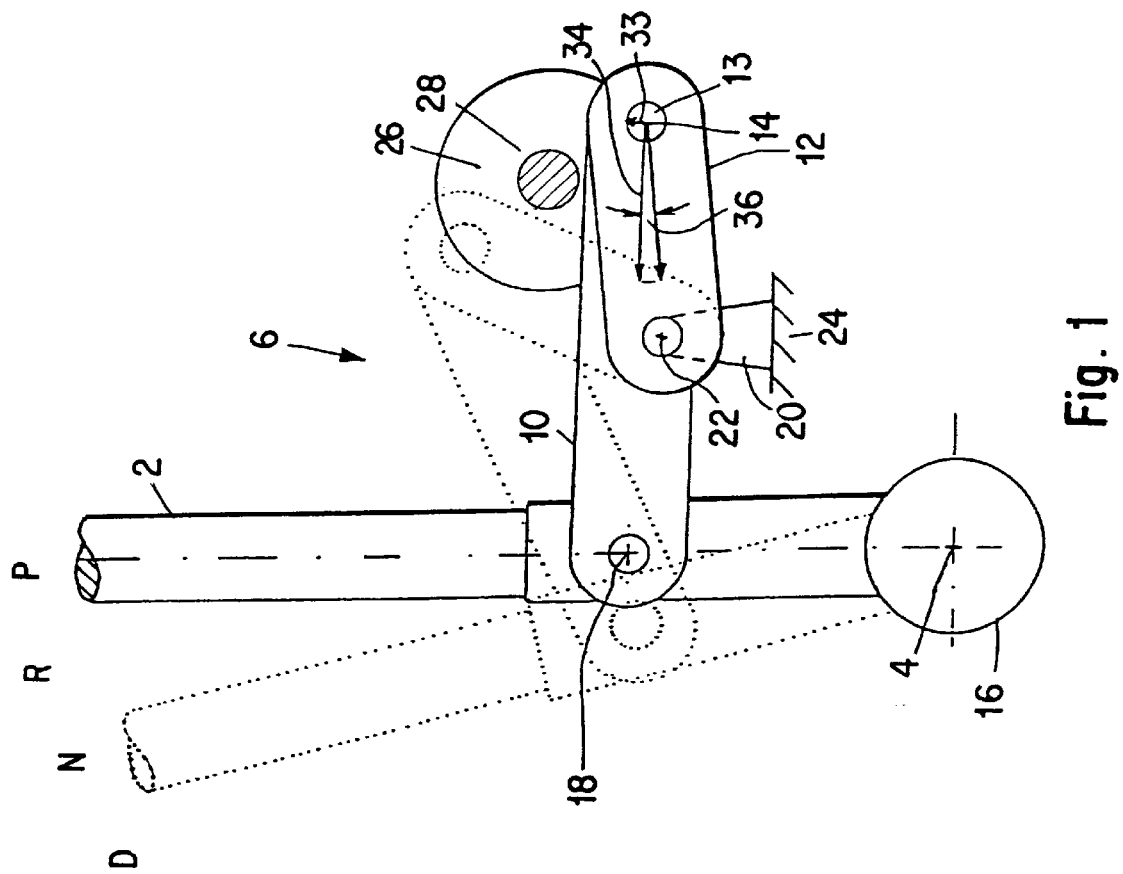
FIG. 1 is a schematic frontal view of the selection system according to the invention for an automatic motor vehicle transmission.
Figure 2:
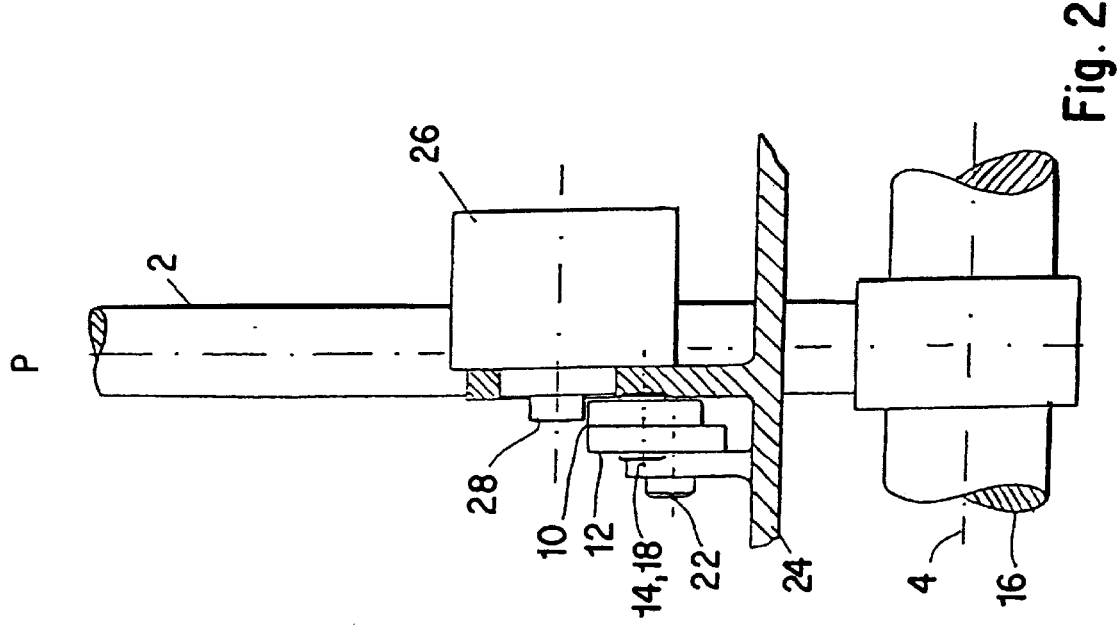
FIG. 2 is a side view of the selection system of FIG. 1 viewed from the right.

The selection system according to FIGS. 1 and 2 for the automatic transmission of a motor vehicle is configured for selecting different transmission adjustments, such as a parking position P, a reversing position R, a neutral position or engine idling position N and a normal forward driving position D. The transmission ratios are automatically changed as a function of driving conditions, particularly the vehicle speed, the torque demand, the acceleration or deceleration. If desired, additional forward driving positions of the selector element for adjusting a defined invariable rotational speed ratio of the transmission can also be provided. The selector element may be a linearly adjustable slide or, according to the illustrated embodiment, preferably a selector lever 2 which can be swivelled about a selector lever axis of rotation 4 to one of the mentioned positions P, R, N, or D respectively.

The locking system contains a toggle lever arrangement designated generally by numeral 6 with a toggle assembly 8 which is formed by two levers or legs 10, 12. The two leg ends are connected with one another by a toggle assembly shaft 13 and can be rotated relative to one another about a toggle assembly axis of rotation 14.

The end of the one leg 10 away from the toggle assembly 8 is rotatably connected with the selector lever 2 about an axis of rotation 18 which is situated closer to the selector lever axis of rotation 4 than to a manually operable free end of the selector lever 2. The end of the other leg 12 away from the toggle assembly 8, which leg 12 is preferably shorter than the leg 10, is rotatably about an axis of rotation 22 disposed in a stationary bearing 20 which is stationary with respect to a schematically shown housing 24. The selector lever rotation axis 4 is also a stationary manner and is formed by a transmission shifting shaft 16. All rotation axes 4, 14, 18 and 22 are arranged parallel to one another.

Swivelling of the selector lever 2 from the parking position P to one of its other positions R, N or D swivels the toggle assembly 8 about the stationarily arranged rotation axis 22 of the stationary bearing 20. The dotted lines in FIG. 1 show the position of the selector lever 2 in the neutral position N and the position of the corresponding toggle lever arrangement 6.

A controllable actuator in the form of a solenoid has an armature 28 which can be linearly adjusted parallel to the rotation axes 4, 14, 18 and 22 by a positioning spring (not shown) into the locking position illustrated in FIG. 2 and, when the solenoid 26 is switched on, by its electromagnetic force against the spring force of the positioning spring into an unlocking position. A part of the armature 28 serving as a locking element, in the locking position according to FIGS. 1 and 2, is in the moving path of the toggle lever arrangement but, in the unlocking position, is laterally beside this moving path.

Preferably, the armature 28 is arranged along the moving path of the two legs 10, 12 at a point which corresponds to an adjustment of the selector lever between the parking position P and the neutral position N, for example, the parking position R. The two legs 10, 12 have such a width that, in the locking position, the armature 28 locks the toggle lever arrangement 6 and therefore also the selection lever 2 starting from the to parking position P in the forward adjusting direction as well as starting from the neutral position N in the reverse adjusting direction each in the direction toward the parking position R. The side edges or stop elements of the legs 10, 12 are used as locking surfaces which interact with the armature 28. The armature 28 can either be used as a locking element itself or by way of an element lengthening it. According to an illustrated embodiment, the locking element can be a lever or a pawl which is operated by the armature 28 and the positioning spring. In such case, the armature 28 may be arranged parallel or transversely to the rotation axes 4, 18, 14 and 22.

In the parking position P of the selector element 2, the solenoid 26 is switched off and its armature 28 is held by the positioning spring in the moving path of the toggle assembly 8 in the locking position. The positioning spring may be a tension spring or a pressure spring, depending on its arrangement relative to the armature 28. When the starting conditions exist, i.e., the ignition key was operated in the ignition lock and the vehicle foot brake is depressed, an electronic control unit 32 automatically switches on the solenoid 26, i.e., supplies it with current. The switched-on solenoid 26 pulls its armature 28 against the force of the positioning spring out of the moving path of the toggle assembly 8 into an unlocked position. The selector lever 2 can now be moved from the parking position P into the reverse position R and farther into the neutral position N, and to the forward driving position D and back again.

When the forward driving speed in the forward driving position D or in the neutral position N exceeds a defined limit value, for example, 8 km/h, the control unit 32 switches off the solenoid 36 again so that its armature 28 is brought by the positioning spring from the unlocked position into the locked position. As a result, a so-called R-lock is obtained because the selector lever 2 cannot be moved back from the neutral position N into the reversing position R. The solenoid 26 is only switched on again by the control unit 32 and therefore its armature 28 is withdrawn out of the moving path of the toggle assembly 8, thereby eliminating the locking effect, when the vehicle speed falls below the mentioned limit value. After this unlocking, the selector lever 2 can be moved back again into the reversing position R and beyond it into the parking position P.

During the unlocking operation, the solenoid 26 must no longer overcome any frictional forces between the armature 28 and the toggle lever arrangement 6 if no manual force is exercised on the selector lever 2. But even if a manual force is exercised on the selector lever 2 by a driver before the toggle lever arrangement 6 is unlocked, the transverse force 33 exercised on the armature 28 is several times smaller than the manual force acting on the selector lever 2, as illustrated in FIG. 1 by a parallelogram of forces as seen by the arrows when the armature 28 or its locking element is situated in the locking position in the moving path or close to the moving path of the toggle assembly axis of rotation 14.

The transverse force exercised by the selector lever 2 by way of the toggle lever arrangement 6 on the armature 28 decreases as the angle 36 between the legs 10, 12, as measured between the straight-line connections of the toggle assembly rotation axes 14 to the rotation axes 18, 22 of the leg ends away therefrom depresses. The point of this angle 36 is situated in the toggle assembly rotation axes 14. This demonstrates that a manual force onto the selector lever 2 in its parking position P will generate no transverse force at all from the toggle lever arrangement onto the armature 28 if, in this parking position P, the two legs 10, 12 are arranged parallel to one another (in the covering position). In such an embodiment, however, the selector lever 2 in the parking position P cannot swivel the toggle lever arrangement 6 about its stationary rotation axis 22 because, in the parking position P, no transverse force can be exercised onto the toggle assembly 8.

Figure 3:
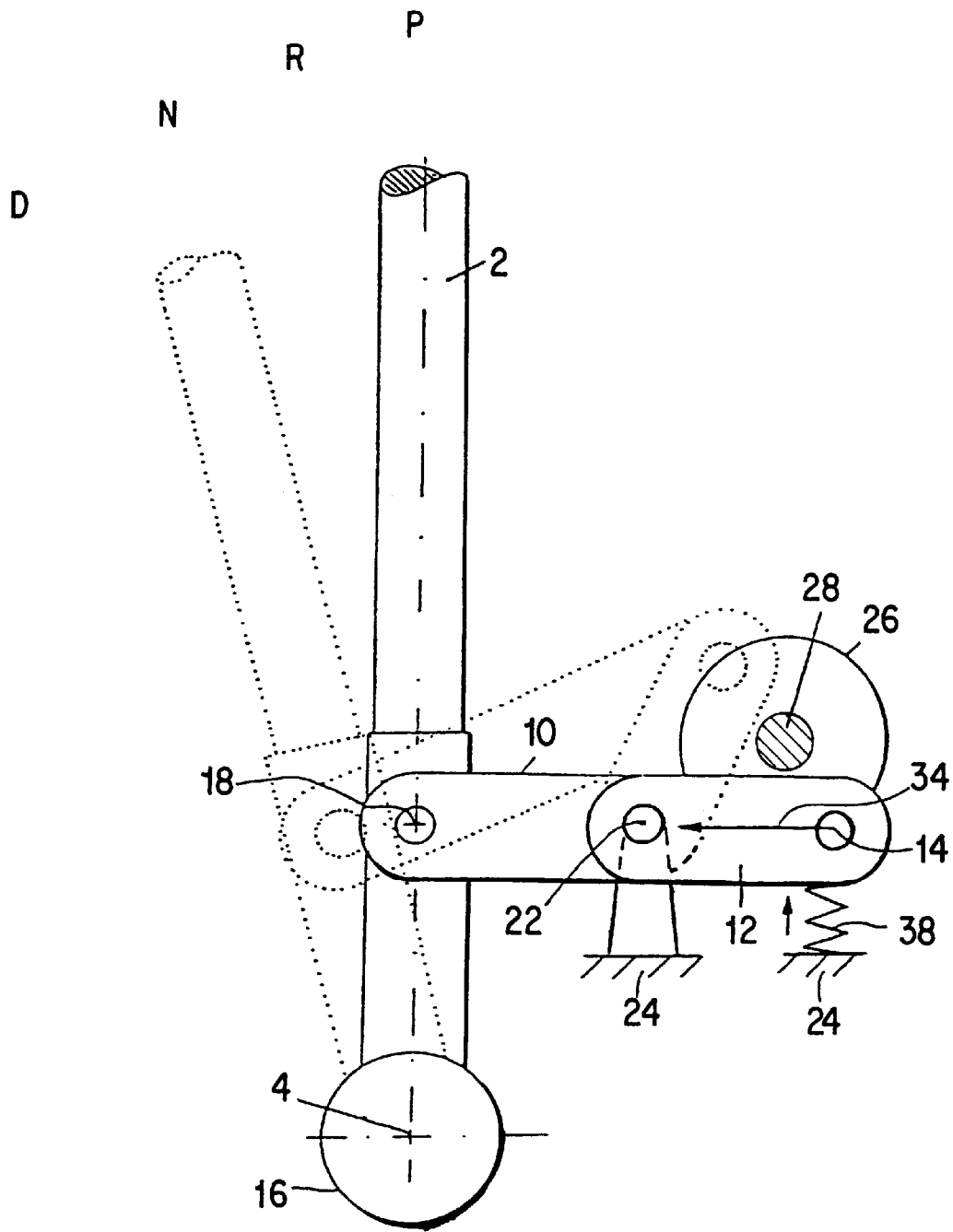
FIG. 3 is a schematic front view similar to FIG. 1 but of another embodiment of the selection system according to the invention.

Thus, an auxiliary force is required in the form of a spring 38 or another actuator which generates an initial movement of the toggle assembly 8, which follows the adjusting movement of the selector lever 2, about the stationary axis of rotation 22 of the toggle lever arrangement 6, as illustrated in FIG. 3. A spring 38 for generating such an auxiliary force can also be used for the embodiment according to FIG. 1. The frictional force between the toggle lever arrangement 6 and the armature 28 generated thereby is relatively low.

The described invention has the advantages that a manual force on the selector lever 2 generates no or almost no stress to the solenoid and requires very little space. The space requirement will be particularly small if, corresponding to the illustrated embodiment, the solenoid is arranged parallel to the selector lever axis of rotation 4.

In the illustrated embodiments of FIGS. 1 to 3, the transmission adjusting positions P, R, N and D of the selector lever 2 are situated behind one another in the moving direction, in which it also operates the toggle lever arrangement 6. According to another embodiment, which is not shown, it is, however, also possible to arrange the moving direction of the selector element 2, in which it operates the toggle lever arrangement 6, transversely to a second moving direction in which some or all transmission adjusting positions P, R, N and D are situated behind one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A selection system for an automatic motor vehicle transmission, comprising a manual selector element configured to be manually adjustable to different positions for selecting transmission adjustments, a locking system having a locking element controlled actuator arrangement for automatic locking and unlocking of the selector element in at least one defined position (P, N) as a function of defined operating conditions, wherein the locking system further comprises a toggle lever arrangement having a toggle assembly formed by two legs, an end of one of the legs being rotatable about a first rotation axis connected with the selector element, and an end of the other of the legs arranged to be swivellable about a second rotation axis disposed in a stationary bearing, the first and second rotation axes and a toggle assembly axis of rotation are arranged parallel to one another and at a substantially right angle with respect to a moving direction of the selector element such that the toggle assembly moved by the selector element swivels about the second rotation axis, and the locking element is operatively arranged to selectively block and release the toggle assembly from movement along a predetermined path as a function of the operating conditions.

2. The selection system according to claim 1, wherein the selector element is a selector lever which is swivellably arranged about a selector element rotation axis which is parallel to the axes of rotation of the toggle assembly.

3. The selection system according to claim 2, wherein the locking element is arranged to be movable in a direction parallel to the rotation axes of the toggle assembly.

4. The selection system according to claim 1, wherein the locking element is arranged to be moved in a direction parallel to the rotation axes of the toggle assembly.

5. The selection system according to claim 4, wherein the selector element is a selector lever which is swivellably arranged about a selector element rotation axis which is parallel to the axes of rotation of the toggle assembly.

6. The selection system according to claim 1, wherein the controlled actuator arrangement comprises a solenoid with an electromagnetically movable armature.

7. The selection system according to claim 6, wherein a linear moving direction of the armature is arranged parallel to the rotation axes of the toggle assembly.

8. The selection system according to claim 1, wherein, in a locking position, the locking element is positioned in the moving path of the toggle lever arrangement at a point which is situated between a point corresponding to a parking position (P) and a point corresponding to a neutral position (N) of the selector element, and the locking element and the toggle assembly are operatively coordinated with one another such that, in the parking position (P), the two legs are positioned on one side of the locking element and, in the neutral position (N) of the selector element, the two legs are positioned on another side of the locking element.

9. The selection system according to claim 8, wherein the selector element is a selector lever which is swivellably arranged about a selector element rotation axis which is parallel to the axes of rotation of the toggle assembly.

10. The selection system according to claim 9, wherein the locking element is arranged to be moved in a direction parallel to the rotation axes of the toggle assembly.

11. The selection system according to claim 8, wherein the control actuator arrangement comprises a solenoid with an electromagnetically movable armature.

12. The selection system according to claim 11, wherein a linear moving direction of the armature is arranged parallel to the rotation axes of the toggle assembly.

13. The selection system according to claim 8, wherein between the parking position (P) and the neutral position (N), the selector element has a reversing position (R) and is not enabled to be moved from either the parking position (P) or the neutral position (N) into the reversing position (R) when the locking element is in the locking position.

14. The selection system according to claim 1, wherein the the locking element is arranged to be pushed into a locking position thereof, and the controlled actuator arrangement, in a switched-on state, is arranged to move the locking element into an unlocking position.

15. The selection system according to claim 1, wherein the two legs are arranged in an end position (P) of the selector element at an angle with respect to one another which is the smallest angular relationship achieved, measured between straight connection lines between rotation axes thereof, the moving direction of the selector element is directed away from the toggle assembly so that the angle between the legs is enlarged during such a movement.

16. The selection system according to claim 1, wherein a point of engagement of the locking element with the toggle assembly is closer to the toggle assembly rotation axis than to other rotation axes thereof.

* * * * *